US010370869B2

(12) United States Patent
Yang et al.

(10) Patent No.: US 10,370,869 B2
(45) Date of Patent: Aug. 6, 2019

(54) HORSESHOE-SHAPED LOCK

(71) Applicant: BEIJING MOBIKE TECHNOLOGY CO., LTD., Beijing (CN)

(72) Inventors: Zhongjie Yang, Beijing (CN); Yiping Xia, Beijing (CN); Yang Wang, Beijing (CN); Hongdu Jin, Beijing (CN)

(73) Assignee: BEIJING MOBIKE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/717,574

(22) Filed: Sep. 27, 2017

(65) Prior Publication Data

US 2018/0080256 A1    Mar. 22, 2018

Related U.S. Application Data

(63) Continuation of application No. PCT/CN2016/106195, filed on Nov. 17, 2016.

(30) Foreign Application Priority Data

Dec. 6, 2015   (CN) .......................... 2015 1 0886397

(51) Int. Cl.
*E05B 47/00*   (2006.01)
*E05B 47/06*   (2006.01)
(Continued)

(52) U.S. Cl.
CPC .......... *E05B 47/0603* (2013.01); *B62H 5/00* (2013.01); *B62H 5/20* (2013.01); *E05B 9/00* (2013.01);
(Continued)

(58) Field of Classification Search
CPC ........ E05B 47/0603; E05B 9/00; E05B 17/10; E05B 45/06; E05B 47/0012;
(Continued)

(56) References Cited

U.S. PATENT DOCUMENTS 596,596 A * 1/1898 Johnson ................ E05B 37/025
70/25
4,773,241 A * 9/1988 Peitsmeier ........ B60R 25/02126
70/182
(Continued)

FOREIGN PATENT DOCUMENTS

CN   102561842 A   7/2012
CN   202669966 U   1/2013
(Continued)

OTHER PUBLICATIONS

United States Patent and Trademark Office, International Search Report (ISR) and Written Opinion for International Application No. PCT/CN2016/106195, dated Feb. 22, 2017, 12 pages, State Intellectual Property Office of the P.R.C.

*Primary Examiner* — Suzanne L Barrett
(74) *Attorney, Agent, or Firm* — Alston & Bird LLP

(57) ABSTRACT

An anti-theft lock is provided, comprising: a lock pin provided with a retaining groove and configured to realize unlocking or locking through movement of the lock pin; a tongue configured to be able to enter the retaining groove to stop the movement of the lock pin or move out of the retaining groove to release the lock pin to allow the lock pin to move; and a tongue driving member connected to an output shaft of a motor and configured to convert a rotational driving force of the motor into a driving force allowing the tongue to move out of the retaining groove.

8 Claims, 6 Drawing Sheets

(51) Int. Cl.
    *B62H 5/00* (2006.01)
    *B62H 5/20* (2006.01)
    *E05B 9/00* (2006.01)
    *E05B 17/10* (2006.01)
    *E05B 45/06* (2006.01)
    *G07C 9/00* (2006.01)
    *B62H 5/14* (2006.01)

(52) U.S. Cl.
    CPC .............. *E05B 17/10* (2013.01); *E05B 45/06* (2013.01); *E05B 47/00* (2013.01); *E05B 47/0012* (2013.01); *G07C 9/00944* (2013.01); *B62H 5/14* (2013.01); *B62H 5/147* (2013.01); *E05B 2047/0069* (2013.01); *E05B 2047/0095* (2013.01)

(58) Field of Classification Search
    CPC ..... E05B 2047/0069; E05B 2047/0095; B62H 5/20; G07C 9/00944
    USPC ..... 70/278.1–278.7, 233, 14, 15, 16, 18, 19, 70/52–58, 182–186
    See application file for complete search history.

(56) References Cited

U.S. PATENT DOCUMENTS

| | | | | |
|---|---|---|---|---|
| 5,636,537 | A * | 6/1997 | Chen | B60R 25/0225 292/144 |
| 5,676,000 | A * | 10/1997 | Chen | B60R 25/0225 307/10.2 |
| 5,762,512 | A * | 6/1998 | Trant | H01M 2/1055 320/114 |
| 6,076,382 | A * | 6/2000 | Naganuma | B60R 25/02 70/186 |
| 6,571,587 | B2 * | 6/2003 | Dimig | B60R 25/02153 70/186 |
| 7,021,093 | B2 * | 4/2006 | Fukatsu | B60R 25/02153 70/186 |
| 8,347,660 | B2 * | 1/2013 | Guenther | E05B 67/02 70/40 |
| 8,875,550 | B1 * | 11/2014 | Spunt | G07C 9/00896 70/233 |
| 2006/0288744 | A1 * | 12/2006 | Smith | E05B 47/06 70/38 B |
| 2008/0012686 | A1 * | 1/2008 | Bonestroo | E05B 47/00 340/5.53 |
| 2008/0094192 | A1 * | 4/2008 | Dutt | B62H 3/02 340/427 |
| 2009/0031766 | A1 * | 2/2009 | Stobbe | E05B 45/005 70/263 |
| 2010/0212380 | A1 | 8/2010 | Tribout | |
| 2010/0283575 | A1 * | 11/2010 | Tubb | E05B 39/00 340/5.1 |
| 2012/0011902 | A1 * | 1/2012 | Meekma | E05B 47/0012 70/25 |
| 2013/0036781 | A1 * | 2/2013 | Hartmann | E05B 39/00 70/431 |
| 2014/0000322 | A1 * | 1/2014 | Williams | E05B 73/0011 70/18 |
| 2014/0109631 | A1 * | 4/2014 | Asquith | E05B 45/005 70/15 |
| 2014/0157838 | A1 * | 6/2014 | Nave | E05B 67/22 70/52 |
| 2015/0020558 | A1 * | 1/2015 | Williams | B62H 5/00 70/18 |
| 2016/0217637 | A1 * | 7/2016 | Gengler | G07C 9/00174 |
| 2016/0333611 | A1 * | 11/2016 | Mabry | E05B 71/00 |
| 2018/0015974 | A1 * | 1/2018 | Yang | B60R 25/34 |
| 2018/0018840 | A1 * | 1/2018 | Xia | G07C 9/00103 |
| 2018/0018841 | A1 * | 1/2018 | Gengler | E05B 67/22 |

FOREIGN PATENT DOCUMENTS

| | | |
|---|---|---|
| CN | 204726558 U | 10/2015 |
| CN | 105460105 A | 4/2016 |
| CN | 105480327 A | 4/2016 |
| CN | 105480329 A | 4/2016 |
| CN | 205311744 U | 6/2016 |
| CN | 205311745 U | 6/2016 |
| CN | 205417866 U | 8/2016 |

* cited by examiner

Thin Housing Portion | Thick Housing Portion (A)          (B)

HORSESHOE-SHAPED LOCK

CROSS REFERENCE TO RELATED APPLICATIONS

This application is a continuation of International Application No. PCT/CN2016/106195, filed on Nov. 17, 2016, which application further claims priority to Chinese Patent Application No. 201510886397.3, filed on Dec. 6, 2015, the contents of both of which are hereby incorporated by reference in their entireties.

BACKGROUND

Related Field

The present invention relates to a horseshoe-shaped lock, and more particularly, to a horseshoe-shaped lock for a two-wheeler or a tricycle.

Description of Related Art

China is a big country in producing and using bicycles which always serve as main transportation tools for people travelling a short distance in a city. Due to advantages of a low price, a light weight, energy saving and environmental friendliness of the bicycles, especially with deepening ideas of green tourism, environmental protection and the like in recent years, more and more people start to choose green travel manners, such as bicycle riding. However, when riding bicycles, users have to face the problem of bicycle theft. At present, although there are many types of anti-theft devices on the market, such as mechanical locks, electronic locks and the like, anti-theft effects thereof are unsatisfactory in general. Thieves can unlock or directly damage the locks only with a very short time, or some even steal bicycles with the locks. As a result, this problem not only brings property loss to the users, but also causes great inconvenience.

Therefore, there is a pressing need to provide a more efficient and more user-friendly bicycle anti-theft system and anti-theft lock as well as a bicycle with the same.

BRIEF SUMMARY

In order to solve the above technical problems, the present invention provides the following technical solutions.

According to an aspect of the present invention, there is provided a horseshoe-shaped lock with a substantially C-shaped lock opening. The horseshoe-shaped lock comprises: a case comprising a lock body portion and side arm portions extending from left and right sides of the lock body portion respectively to form the substantially C-shaped lock opening, a battery compartment housing arranged inside the lock body portion, a lock pin provided with a retaining groove and configured to open or close a lock opening through movement thereof along a lock groove formed in the side arm portion, a tongue arranged on the outer surface of the battery compartment housing and configured to stop or release movement of the lock pin by entering or exiting from the retaining groove of the lock pin, a first force application member for exerting, on the lock pin, a force allowing the same to move in the direction of opening the locking opening, a second force application member for exerting, on the tongue, a force allowing the same to move in the direction of entering the retaining groove of the lock pin, a PCB (Printed Circuit Board) accommodated in the battery compartment housing, a battery accommodated in the battery compartment housing and configured to provide electric power to all electronic components in the horseshoe-shaped lock, a motor arranged on the outer surface of the battery compartment housing, a motor driving module mounted on the PCB and configured to drive an output shaft of the motor to rotate; a tongue driving member connected to the output shaft of the motor and configured to convert a rotational driving force of the motor into a driving force allowing the tongue to move out of the retaining groove of the lock pin, and a location sensor arranged on the outer surface of the battery compartment housing and configured to detect whether the tongue is moved out of the retaining groove or not, wherein when the location sensor detects that the tongue is moved out of the retaining groove, the motor driving module stops driving the motor to rotate.

DETAILED DESCRIPTION OF VARIOUS EMBODIMENTS

The present invention will now be described in detail with reference to specific implementations. For clarity, parts or structures known to those skilled in the art are not specifically described herein. In addition, although the present invention is described with reference to certain examples, it should be understood that such description is not intended to limit the present invention within the described examples. On the contrary, such description is intended to encompass all substitutions, improvements and equivalent solutions within the spirit and scope of the present invention defined in the appended claims.

Examples of a bicycle anti-theft lock and system are taken to illustrate hereinafter, but of course, the anti-theft lock and the anti-theft system may also be applied to any of two-wheelers and tricycles such as electric bicycles and motorcycles.

Figure 1:
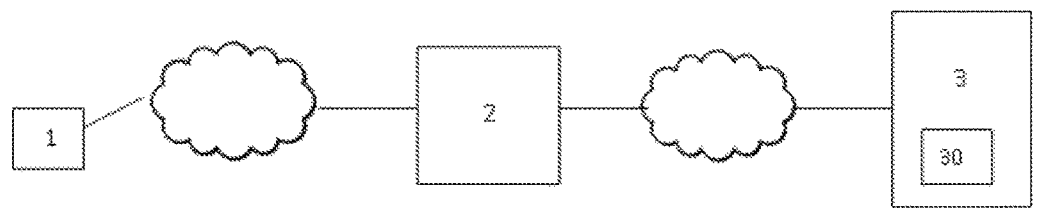
FIG. 1 is a schematic view of an overall structure of an anti-theft system provided by the present invention.

FIG. 1 is a schematic view of an overall structure of an anti-theft system provided by the present invention. As shown in FIG. 1, the system comprises mobile communication equipment 1, a cloud calculator 2 and a bicycle 3. The bicycle 3 comprises an anti-theft lock 30. The mobile communication equipment 1 establishes communication with the cloud calculator 2 via a wireless network; the cloud calculator 2 establishes communication with the anti-theft lock 30 of the bicycle via the wireless network; and the cloud calculator 2 and/or the mobile communication equipment 1 receive(s) bicycle state information and the like sent from the anti-theft lock 30 of the bicycle 3 and manage(s) the bicycle. In addition, the mobile communication equipment 1 controls the anti-theft lock 30 of the bicycle 3 via the cloud calculator 2, or the cloud calculator 2 directly controls the anti-theft lock 30 of the bicycle 3.

In the present invention, the mobile communication equipment 1 may send or receive a signal via a wired or wireless network or other manners, or may process or store the signal, for example, in a memory in a physical storage state. Each piece of the mobile communication equipment 1 may be an electronic device that comprises hardware, software, or an embedded logic component or a combination of two or more such components, and is capable of executing appropriate functions implemented or supported by the mobile communication device. For example, the mobile communication equipment may be a smart phone, a tablet computer, a portable e-mail device, an electronic book, a handheld game machine and/or a game controller, a notebook computer, a netbook, a handheld electronic device, a smart wear device, and the like. The present invention covers any suitable mobile communication equipment. The mobile communication equipment may enable a user using the same to access the network. In particular, the mobile communication equipment may comprise a processing device including an application processing unit and a radio frequency/digital signal processor, a display screen, a mini keyboard that may comprise physical keys, touch keys covering the display screen or a combination thereof, a user identification module card, a memory device that may comprise an ROM, an RAM, a flash memory or any combination thereof, a Wi-Fi and/or Bluetooth interface, a wireless telephone interface, a power supply management circuit with an associated battery, a USB interface and connector, an audio management system with an associated microphone, speaker and headphone jack, and various optional accessories such as a digital camera, a global positioning system and an accelerator. In addition, various client applications may be installed on the mobile communication equipment, and may be configured to allow the use of the mobile communication equipment to transmit commands suitable for operation with other devices. Such applications may be downloaded from a server and installed into the memory of the mobile communication equipment, and may be pre-installed on the mobile communication equipment. In the embodiments of the present invention, the mobile communication equipment 1 is provided with a bicycle user terminal application which can assist the user in realizing functions of managing the bicycle 3, wherein the functions include, but are not limited to, theft prevention. In other embodiments of the present invention, the mobile communication equipment 1 may also be provided with a maintenance personnel application that may be configured to assist the maintenance personnel in realizing functions of operational management for the bicycle 3, wherein the functions include, but are not limited to, theft prevention, maintenance and the like. According to some embodiments of the present invention, the mobile communication equipment 1 can obtain a location of the bicycle 3 by running a bicycle user terminal. Further, if the bicycle 3 is stolen, the mobile communication equipment 1 will receive a prompt message from the cloud calculator 2. In addition, the user can remotely unlock the bicycle 3 through the mobile communication equipment 1.

In the present invention, the cloud calculator 2 is a server. The server in this description should be understood as a service point providing processing, database and communication facilities. For example, the server may be a single physical processor having related communication, data storage and database facilities, or a networked or clustered processor, or a cluster of related networks and storage devices, and can operate software, one or more database systems and application software providing services supported by the server. The servers may vary greatly in configuration or performance, but generally the server may include one or more central processing units and memories. The server further include one or more large-volume storage devices, one or more power sources, one or more wired or wireless network interfaces, one or more input/output interfaces, one or more operating systems such as Windows Server, Mac OS X, Unix, Linux and FreeBSD, and the like. In particular, the cloud calculator may be an integral server or a distributed server across multiple computers or computer data centers. The server may include various servers, such as but not limited to a network server, a news server, a mail server, a message server, an advertisement server, a file server, an application server, an interactive server, a database server or a proxy server. In some embodiments, each server may include hardware, software or an inbuilt logic assembly or two or more of such assemblies used to execute suitable functions supported by the server. In the present invention, the server is configured to provide all functions necessary to support bicycle management. In the present invention, the cloud calculator can calculate and determine whether a signal sent by the anti-theft lock is caused by a theft or not. In addition, the cloud calculator may send an instruction to the anti-theft lock to control it to/not to send an alarm; and the cloud calculator may also send an instruction to the anti-theft lock to enable the same 30 to upload state information (e.g., positioning information) of the bicycle periodically or in real time.

In the present invention, the wireless network covers any suitable wireless network, such as but not limited to a 4G network, a 3G network, a GPRS network, a Wi-Fi network or the like. In addition, the wireless network through which the cloud calculator 2 and the mobile communication equipment 1 are coupled together may be the same as or different from the wireless network through which the cloud calculator 2 and the bicycle 3 are coupled together.

[Functional Modules of Anti-theft Lock]

Figure 2:
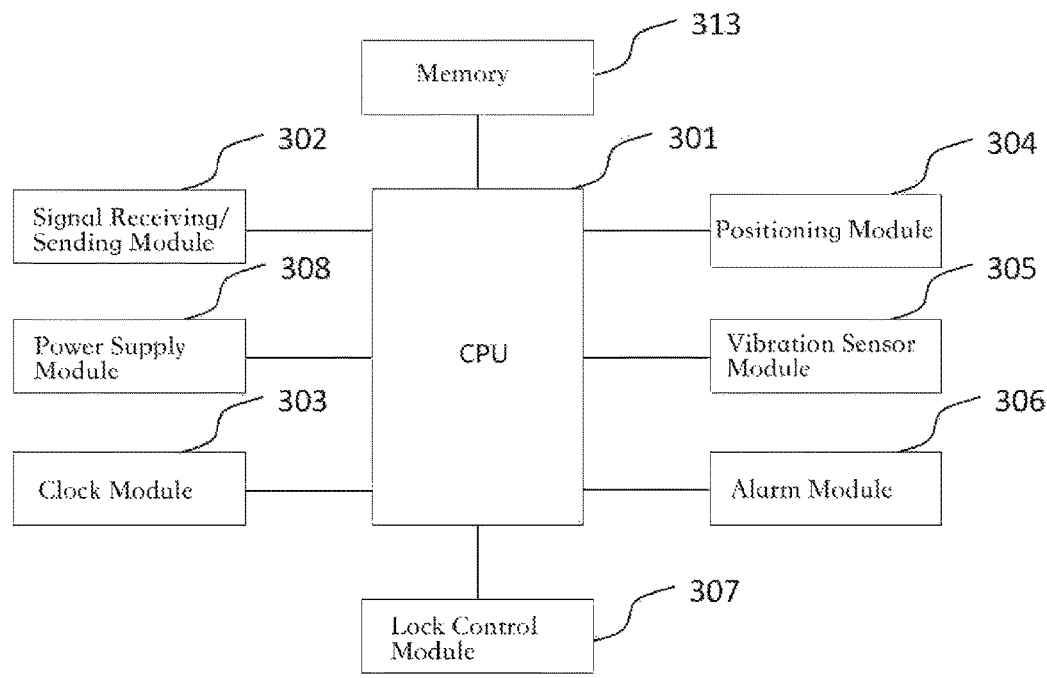
FIG. 2 is a schematic view of functional modules of a bicycle anti-theft lock provided by the present invention.

FIG. 2 is a schematic view of functional modules of a bicycle anti-theft lock 30 provided by the present invention. As shown in FIG. 2, the anti-theft lock 30 comprises a CPU module 301, a signal receiving/sending module 302, a clock module 303, a positioning module 304, a vibration sensor module 305, an alarm module 306, a lock control module 307 and a memory 313 which are communicatively connected to the CPU module 301, respectively, and a power supply module 308 for supplying electric power to the all modules.

The CPU module 301 is a central processing unit of the anti-theft lock 30, and is configured to control operations and the like of the all modules of the anti-theft lock 30, wherein the control refers to, for example, processing an instruction from the cloud calculator 2 and information and the like from the other modules of the anti-theft lock 30, and sending control instructions and the like to other modules.

For example, the signal receiving/sending module 302 comprises an antenna, a buffer and the like described later, and may be connected to a wireless network to receive/send information from/to external equipment such as the mobile communication equipment 1, the cloud calculator 2 and the like under the control of the CPU module 301.

The clock module 303 provides time information for the CPU module 301, so that the CPU module 301, the mobile communication equipment 1 and the cloud calculator 2 can acquire current time information of the bicycle 3. If it is not necessary to acquire the current time information of the bicycle 3 (for example, the time information of the bicycle is based on a lock time of the cloud calculator 2), the clock module 303 may be omitted. However, it is possible that the bicycle 3 may be in a variety of environments. For example, if the communication environment is poor while the bicycle is stolen, although the bicycle 3 may move to a communication environment later and the cloud calculator 2 may determine that the bicycle is stolen according to information sent from the anti-theft lock 30, and the like, the specific time when the bicycle is stolen cannot be acquired. Therefore, preferably, the anti-theft lock 30 is provided with the clock module 303 which can store an actual time in a timely manner when the bicycle is stolen in the memory and send the time to the cloud calculator 2 and/or the mobile communication equipment 1 immediately or later, so that an appropriate anti-theft strategy may be taken. The clock module 303 may also be integrated in the CPU module 301 as required.

For example, the positioning module 304 may be a GPS module, a Beidou satellite positioning module or the like, and is capable of collecting current location information (hereinafter referred to as positioning information) and reporting the same to the CPU module 301; and under the control of the CPU module 301, the positioning information may be sent to external equipment such as the mobile communication equipment 1 and/or the cloud calculator 2 via the signal receiving/sending module 302.

For example, the vibration sensor module 305 may be one of various sensors for detecting vibration, such as an acceleration sensor, and may be a sensor as long as it is capable of detecting vibration and providing information such as vibration intensity for the CPU module 301, so that it is not limited to the acceleration sensor.

For example, the alarm module 306 may perform on-site alarm by alarming manners such as sound and/or light after receiving an alarm instruction signal from the CPU module 301. It should be noted that as the anti-theft system provided by the present invention has functions of positioning and tracking a bicycle, the alarm module 306 configured to perform on-site alarm is not an essential component for the anti-theft system provided by the present invention.

The lock control module 307 is configured to unlock the lock pin of the anti-theft lock 30 according to an instruction of the CPU module 301, monitor lock state information (a locking state and an unlocking state) of the anti-theft lock 30, and report the information to the CPU module 301.

The memory 313 is configured to store the time information supplied by the clock module 303 to the CPU module 301 and the positioning information supplied by the positioning module 301 to the CPU module 304, and may store the vibration intensity information supplied by the vibration sensor module 305 to the CPU module 301 as required.

The power supply module 308 comprises a battery and the like described later, and can supply electric power to the various electronic modules described above. It should be noted that in embodiments to be described later, the power supply module 308 may comprise the battery as an electric power storage device; or in a case that the electric power can be supplied from the outside in real time, for example, electric power is generated via solar energy, the battery in the power supply module may be omitted, and the power supply module is implemented via a combination of a photovoltaic element, a capacitor and the like. In addition, in FIG. 2, the power supply module 308 is electrically connected to the CPU module 301 to supply electric power to the other modules via the CPU module 301, or may be electrically connected to each module directly to supply electric power to the same.

It should be noted that all of the modules shown in FIG. 2 may be integrated with the lock as a whole like an embodiment described below, or part of the modules, as separate vehicle-mounted electronic equipment (anti-theft monitoring equipment), may be arranged outside the lock as long as required related information receiving and sending between the modules and the lock can be realized through a necessary circuit. For example, except for the motor assembly, the location sensor and the like described later in the lock control module 307, which must be mounted in the anti-theft lock, other components may be arranged outside the lock as the separate vehicle-mounted electronic equipment (anti-theft monitoring equipment).

[Anti-theft System]

Figure 10:
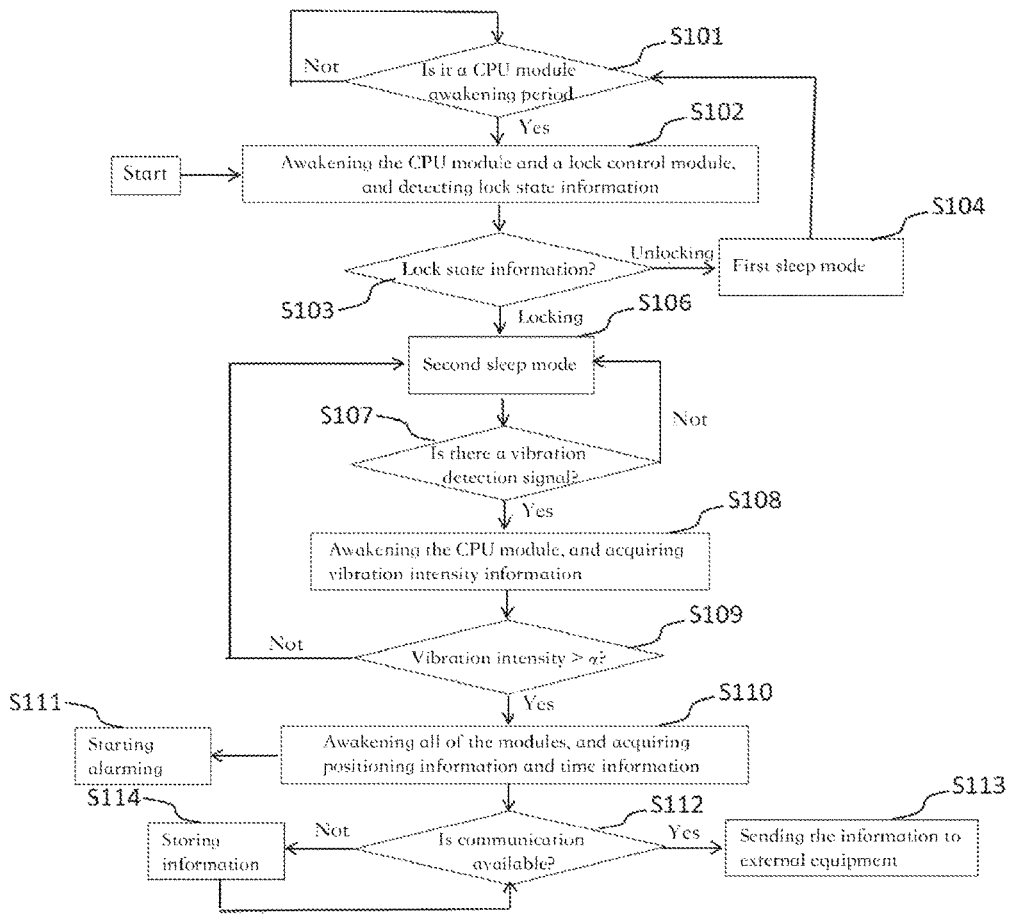
FIG. 10 is a flow chart of implementing the anti-theft system provided by the present invention.

An anti-theft method of the anti-theft system provided by the present invention will be described below. FIG. 10 is a flow chart of the anti-theft method provided by the present invention.

First, the CPU module 301 periodically performs self-awakening according to a preset period (S101) and awakes the lock control module 307 to inquire about current state information of the anti-theft lock (S102).

If the lock control module 307 returns a signal indicating that the anti-theft lock is in an unlocking state ("unlocking" in S103) to the CPU module 301, the CPU module 301 considers that the bicycle is being used normally, so that a first sleep mode is activated to instruct the signal receiving/sending module 302, the clock module 303, the positioning module 304, the alarm module 306 and the lock control module 307 to enter the sleep state, and the CPU module also enters the sleep mode; and the CPU module ignores or shields a vibration detection signal from the vibration sensor module 305 (S104), and waits for a next awakening period (S101). Therefore, when the bicycle is normally used, electric power can be saved as the modules are in the sleep mode.

If the lock control module 307 returns a signal indicating that the anti-theft lock is in a locking state ("locking" in S103) to the CPU module 301, the CPU module 301 activates a second sleep mode to instruct the signal receiving/sending module 302, the clock module 303, the positioning module 304, the alarm module 306 and the lock control module 307 to enter the sleep state, and the CPU module also enters the sleep mode; however, the CPU module 301 does not ignore or shield the vibration detection signal from the vibration sensor module 305 (S106).

In this case, when detecting a vibration ("Yes" in S107), the vibration sensor module 305 sends the vibration detection signal to the CPU module 301, and the CPU module 301 is awakened based on the vibration detection signal, then acquires vibration intensity information in the vibration detection signal (S108), and determines whether the vibration intensity exceeds a preset threshold value α or not (S109).

If the vibration intensity does not exceed the preset threshold value α, it is considered that the vibration is not caused by a destructive behavior, and may be generated only through occasional slight shaking, so the CPU module returns to the second sleep mode ("Not" in S109).

If the vibration intensity exceeds a preset threshold a ("Yes" in S109), it is considered that the vibration is caused by a severe destructive behavior, so the CPU module awakes all the modules, acquires positioning information, current time information and the like continuously or intermittently at a preset time interval (S110), and instructs the alarm module 306 to alarm (S111). Meanwhile, the CPU module detects whether or not it is able to communicate with external equipment such as the cloud calculator 2 and/or the mobile communication equipment 1 (S112) via the signal receiving/sending module 302. If it is possible to communicate ("Yes" in S112), the CPU module reports the acquired positioning information and current time information to the external equipment such as the cloud calculator 2 and/or the mobile communication equipment 1 (S113). If it is temporarily impossible to communicate ("Not" in S112), the CPU module stores the acquired positioning information, current time information, and the like in the memory (S114); and the CPU module detects whether it is able to communicate with the external equipment such as the cloud calculator 2 and/or the mobile communication equipment 1 continuously or intermittently at a preset time interval (S112). If it is detected that the communication is available ("Yes" in S112), the stored positioning information and current time information are reported to the external equipment such as the cloud calculator 2 and/or the mobile communication equipment 1 (S113). In addition, in step S110, the vibration intensity information may also be acquired continuously and stored in step S114, and the vibration intensity information acquired in S113 may be reported to the external equipment such as the cloud calculator 2 and/or the mobile communication equipment 1 together with other information.

[Embodiments of Anti-theft Lock]

FIGS. 3-9 show embodiments of an anti-theft lock 30.

Figure 3:
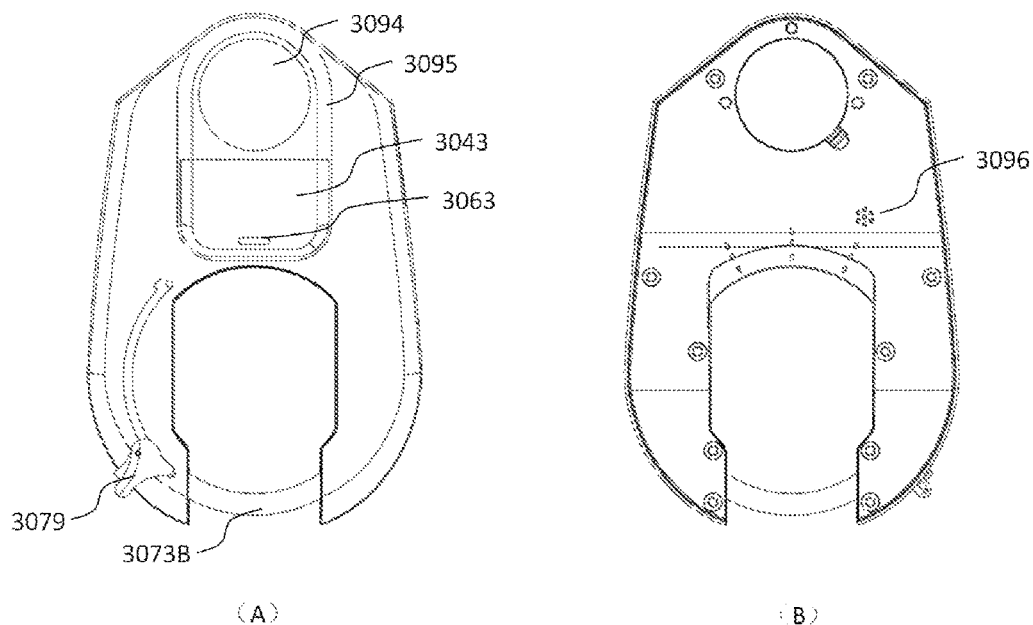
FIG. 3 is a schematic view of an overall appearance of an anti-theft lock, wherein (A) is a front view of the anti-theft lock, and (B) is a rear view of the anti-theft lock.

For facilitating illustration, a state shown in FIG. 3 (A) is as a basis. The width direction of the anti-theft lock 30 is defined as a left-right direction, the height direction of the anti-theft lock 30 is defined as an up-down direction, and the thickness direction of the anti-theft lock 30 is defined as a front-rear direction. In addition, sometimes, the surface of the anti-theft lock shown in FIG. 3 (A) may be referred to as the front surface or the front, and the surface of the anti-theft lock shown in FIG. 3 (B) may be referred to as the back surface or the rear surface.

[About the Case]

Figure 4:
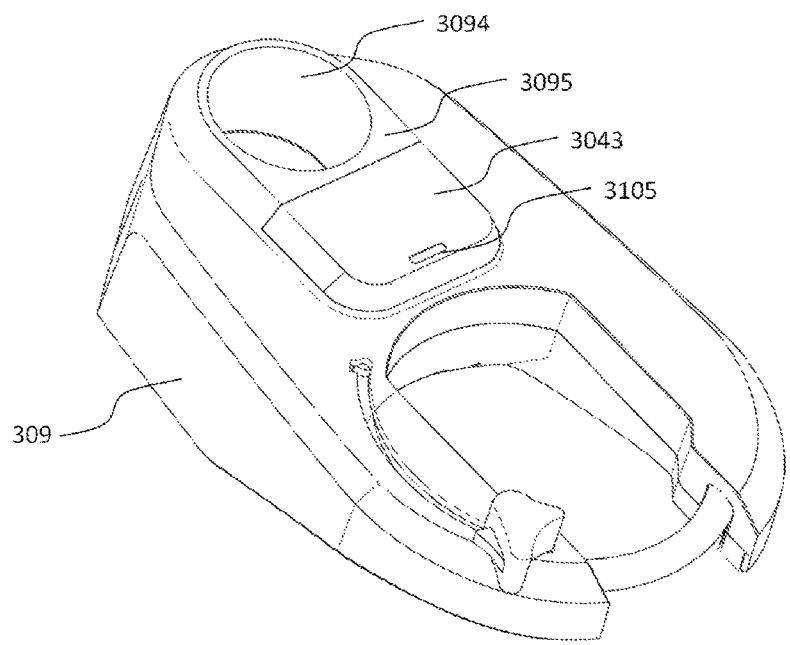
FIG. 4 is a perspective view of the anti-theft lock.

FIG. 3 is a schematic view of an overall appearance of an anti-theft lock 30, wherein FIG. 3 (A) is a front view of the anti-theft lock 30, and FIG. 3 (B) is a rear view of the anti-theft lock 30. FIG. 4 is a perspective view of the anti-theft lock 30.

As shown in FIG. 3 (A), the anti-theft lock 30 in this embodiment is a horseshoe-shaped lock. A case 309 of the anti-theft lock is horseshoe-shaped integrally, and comprises a lock body portion and side arm portions extending from left and right sides of the lock body portion respectively to form a substantially C-shaped lock opening. A lock mounting hole 3094 for mounting the anti-theft lock 30 to a bicycle or the like is formed in the center of the top of the lock body portion. For example, through the hole, the anti-theft lock may be fitted over a frame tube of the bicycle.

A positioning module mounting portion is arranged below the lock mounting hole 3094; and a GPS protection cover 3043 is mounted at the positioning module mounting portion, and the GPS module 3042 and the like described later are accommodated in the GPS protection cover. Referring to FIG. 4, the lock mounting hole 3094, the GPS protection cover 3043 and peripheral portions thereof form a stage in the shape of a trapezoid with oblique sides (hereinafter referred to as a trapezoid stage 3095) whose portions are more protruded forwards than other portions of the front surface of the case 309 and in which the projection areas in the front surface are gradually reduced. Moreover, according to the design, after mounting, the front surface and side surfaces of the GPS protection cover 3043 are smoothly transitioned with the other portions of the trapezoid stage 3095. Therefore, after the GPS protection cover 3043 is fixed to the case 309 as described later, it is not easy to open the GPS protection cover 3043, so that the anti-theft lock is well protected from being destroyed. In addition, a light guide hole 3105 for exposing a light guide post 3063 described later is formed in a position near the bottom of the GPS protection cover 3043.

Figure 7:
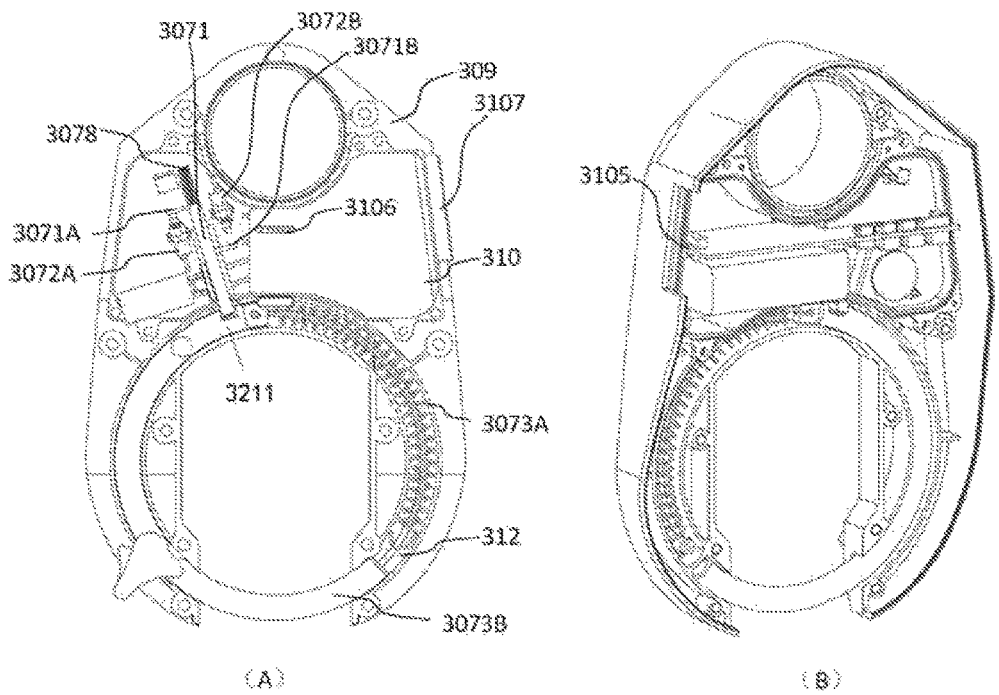
FIG. 7 is a schematic view of an internal structure of the anti-theft lock according to the embodiment of the present embodiment, wherein (A) is a front view of the anti-theft lock after removing a face case, a sealing gasket, a GPS circuit board and a GPS protection cover, and (B) is a rear view of the anti-theft lock after removing a bottom case.

Returning to FIG. 3 (A), an annular lock portion of the horseshoe-shaped lock is arranged below the trapezoid stage 3095, and is in a form of a C-shaped opening which opens downwards. Referring to FIG. 7 described later, a C-shaped lock groove 312 is formed inside the annular lock portion of the case. In addition, a slide hole for guiding a lock pin handle 3079 to slide is further formed in one side arm of the annular lock portion.

Figure 5:
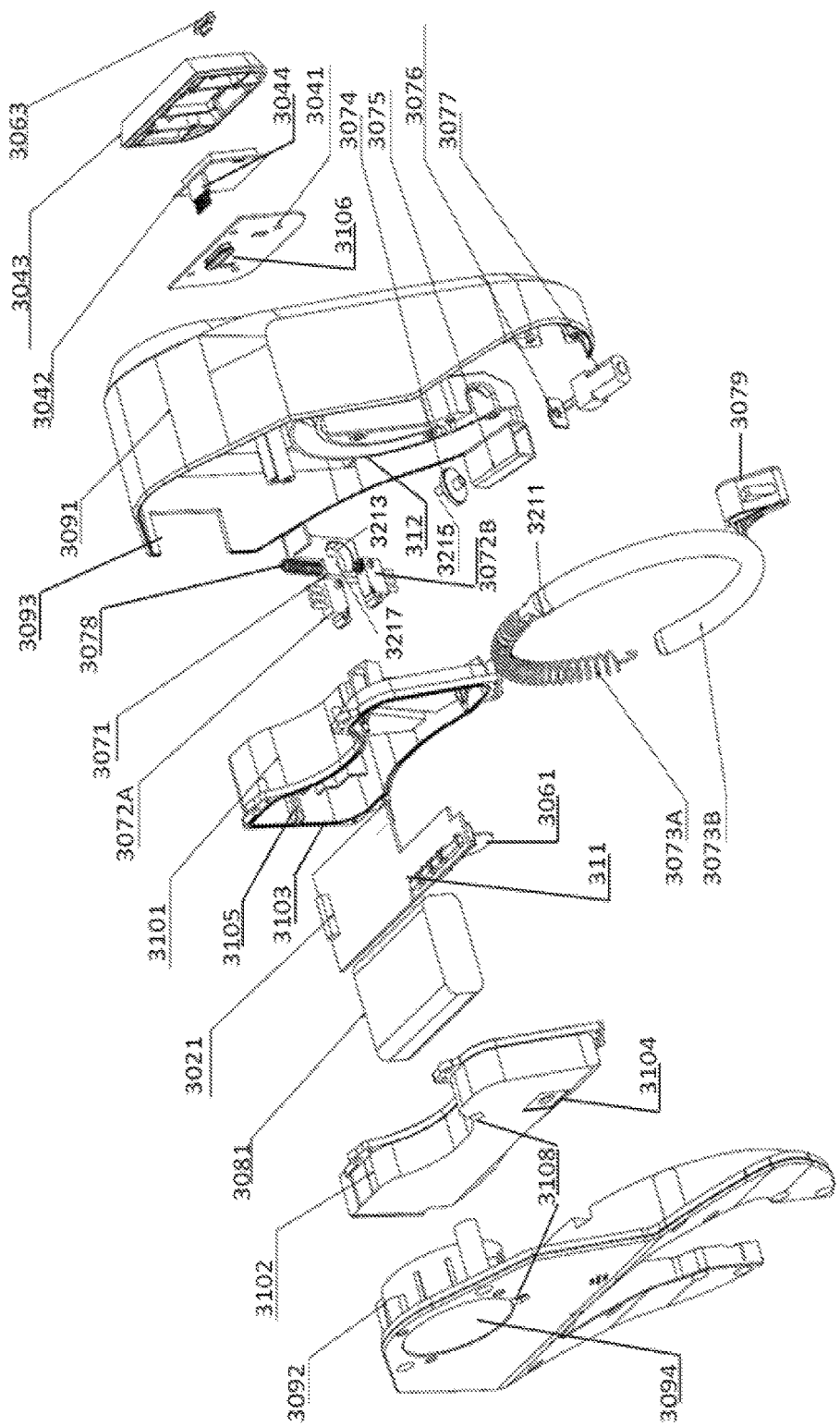
FIG. 5 is a schematically exploded view of all components of the anti-theft lock.

Moreover, referring to FIG. 5, a window 3093 is formed in the side wall of one side (the right side in this embodiment) in the left-right direction of a face case 3091. In order to improve the destruction resistance of the anti-theft lock 30, preferably, the case 309 of the anti-theft lock 30 may be made of a metal material such as stainless steel. As the metal case will shield or overly block radio signal receiving and sending of the signal receiving/sending module 302 (an antenna 3021) accommodated in the case, the window 3093 is formed to reduce the influence of the case 309 on signal receiving and receiving of the antenna 3021.

In addition, as shown in FIG. 3 (B), a sound alarm hole 3096 is formed in the back surface of the case 309, and corresponds to a sound transmission hole 3104 in the battery compartment housing 310 described later.

[About the Internal Components]

FIG. 5 is a schematically exploded view of all components of the anti-theft lock 30. As shown in FIG. 5, the anti-theft lock 30 comprises a case constituted of a face case 3091 and a bottom case 3092; a battery compartment housing constituted of an upper battery compartment cover 3101 and a lower battery compartment cover 3102; a battery 3081 accommodated in the battery compartment housing; a PCB 311 accommodated in the battery compartment housing and integrated with the above-described CPU module 301, the signal receiving/sending module 302, the clock module 303, the vibration sensor module 305, the sound alarm module 3061, and a part of the lock control module 307 (a motor driver not shown in FIG. 5) thereon; a tongue 3071; a spring 3078 connected to the tongue 3071; location sensors for a first limit switch 3072A and a second limit switch 3072B distributed on the left side and the right side of the tongue 3071 respectively; a motor assembly constituted of a motor 3077 for supplying power to the tongue 3071 to enable the same to move, a sealing gasket 3076 mounted at the side of an output shaft of the motor 3077, and a motor box 3075 for accommodating the motor 3077 and the sealing gasket 3076; a tongue driving member 3074 which is connected to the output shaft of the motor 3077 and rotates together with the same; a tension spring 3073A and a lock pin 3073B which are accommodated in the C-shaped lock groove 312 formed in the lower portion of the case; a lock pin handle 3079 connected to the lock pin 3073B and exposed outside the case; another sealing gasket 3041; a GPS circuit board 3042 integrated with a GPS module and a light alarm module thereon; a GPS protection cover 3043; and a light guide post 3063.

[About the Battery Compartment]

Figure 6:
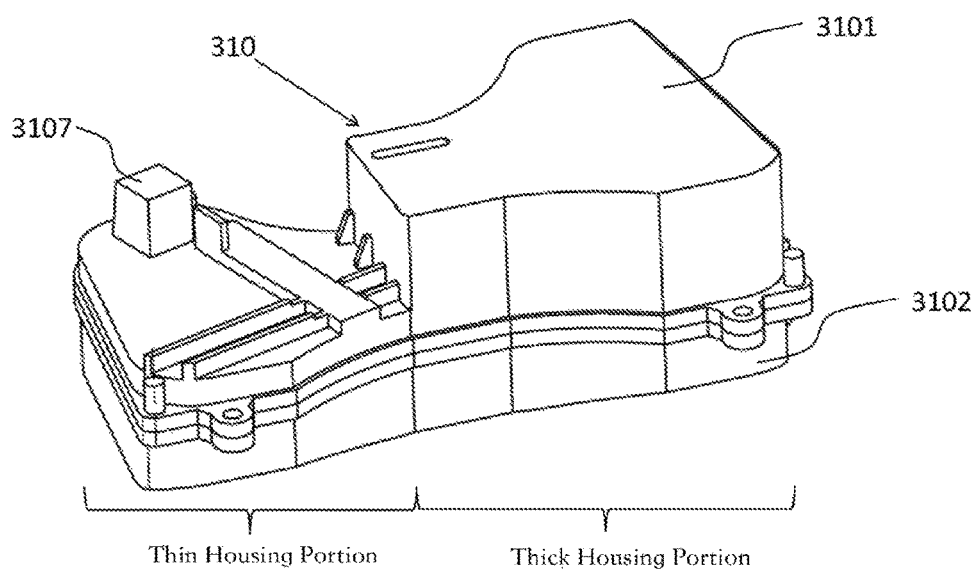
FIG. 6 is a schematically perspective view of a shape and structure of a battery compartment housing of an anti-theft lock according to an embodiment of the present embodiment.

FIG. 6 is a schematically perspective view of a shape and structure of a battery compartment housing 310 according to an embodiment of the present embodiment. As shown in FIG. 6, the battery compartment housing 310 is formed by joining the upper battery compartment cover 3101 and the lower battery compartment cover 3102 via a bolt, and a sealing ring 3103 (referring to FIG. 5) is arranged along the circumference of the joining portion, so that a waterproof and dustproof closed space is formed internally as a battery compartment for accommodating the battery 3081 and the PCB 311. Of course, the upper battery compartment cover 3101 and the lower battery compartment cover 3102 may also be jointed through clamping, bonding, riveting or the like.

In the present embodiment, the battery compartment housing 310 is mounted in a space between the lock mounting hole 3094 and the C-shaped lock groove 312 in the case 309 in the up-down direction, and forms concave portions corresponding to the lock mounting hole 3094 and the C-shaped lock groove 312 respectively in position in a way of bypassing the lock mounting hole 3094 and the C-shaped lock groove 312 (referring to FIG. 7). As shown in FIG. 6, the thickness of the battery compartment housing 310 is inconsistent, and the battery compartment housing comprises a thin housing portion with a smaller thickness and a thick housing portion with a larger thickness. An inner space of the thin housing portion is relatively shallower, and an inner space of the thick housing portion is relatively deeper; and the transition between the thin housing portion and the thick housing portion is stepped.

In addition, a wire outlet hole 3107 allowing a power supply wire to pass through is further formed in the thin housing portion of the battery compartment housing 310. A wire of the PCB 311 is led out from the wire outlet hole 3107 to be connected to a motor and a location sensor described later so as to supply electric power to them and send and receive control signals. As the wire outlet hole 3107 is formed in the thin case portion of the upper battery compartment cover 3101, and a motor assembly and the location sensor of the lock control module described later are arranged at the thin housing portion of the upper battery compartment cover 3101, the wire outlet hole, the motor assembly and the location sensor are made closer in arrangement, reducing the length of the wire, and further compacting the layout of the components. In addition, wire inlet holes 3108 (referring to FIG. 5) are formed in the case 309 (the bottom case 3092) and the battery compartment housing 310 (the lower battery compartment cover 3102) and correspond to the lock mounting hole in position. Through the wire inlet holes, a power supply wire and the like used in charging of, for example, a battery 3081 can be led into the battery compartment from the outside of the case. Because the anti-theft lock can be mounted on a frame tube of a bicycle in a sleeving manner via the lock mounting hole, after a wire leading hole opposite to the wire inlet holes 3108 of the anti-theft lock is drilled at a corresponding position of the frame tube, wires can be hidden inside the frame tube to realize wiring, and thus are prevented from being destroyed easily, greatly improving the safety of the anti-theft lock.

Referring to FIG. 5 and FIG. 7 (B), a slot 3105 is arranged at upper middle portions of the inner sides of the left and right side walls of the battery compartment housing 310, and the PCB 311 is inserted in the slot 3105 in a manner that a normal of the PCB is substantially parallel to the front surface of the lock. Moreover, the change of the width of the PCB 311 in the front-rear direction corresponds to that of the thickness of the battery compartment housing 310; that is, the width of the portion of the PCB 311 located at the thick housing portion in the front-rear direction is relatively larger, while the width of the portion of the PCB located at the thin housing portion in the front-rear direction is relatively smaller. In addition, in this embodiment, the battery 3081 is, for example, a lithium ion battery, and is substantially cuboid-shaped; the largest surface (hereinafter also referred to as the maximum surface) in six surfaces of the cuboid and the surface of the PCB are fixed in the thick housing portion of the battery compartment housing 310 in a manner that the maximum surface is substantially parallel to the surface of the PCB.

Generally, in order to ensure that the PCB has an enough space to mount all of the modules, the reduction of the PCB area is limited; and moreover, in order to ensure an adequate battery capacity, the reduction of the battery pack size is also limited. Therefore, if the PCB and the substantially cuboid battery pack are mounted in an anti-theft lock in a manner that the surface of the PCB is parallel to the largest surface of the battery pack, although the overall thickness of the anti-theft lock is unchanged, a front area of the anti-theft lock must be increased. In a case that a lock front area occupied by the C-shaped lock groove 312 and the lock mounting hole 3094 is not reduced, requirements on the mounting of the PCB and the battery pack can be met only by increasing an area in the height direction (up-down direction) or the width direction (left-right direction) of the lock. As a result, the anti-theft lock looks huge, affecting the beauty and possibly the mounting of the anti-theft lock. In the present invention, a space in the thickness direction of the anti-theft lock is fully utilized, so that the surface of the PCB and the largest surface of the battery are inserted in the space between the C-shaped lock groove 312 and the lock mounting hole 3094 in a manner that the surface of the PCB and the largest surface of the battery are perpendicular to the front of the lock. In this way, the front area of the lock will not be increased excessively, and the lock looks more beautiful and is easy to mount.

In addition, by providing the battery compartment housing with the thin housing portion and the thick housing portion, the battery and the main portion of the PCB can be mounted in the thick housing portion as described above, and the mounting space of the battery and the PCB is ensured; and meanwhile, the motor assembly, the tongue, the location sensor and the like described later can be mounted in an outside space of the thin housing portion. Thus, all of the modules can be compactly arranged in a limited space of the case 309, reducing the overall size of the anti-theft lock.

In addition, a protrusion portion 3107 as shown in FIG. 7 (A) is formed in a side wall portion, corresponding to the window 3093 of the case 309, of the battery compartment housing 310, and is matched with the window 3093 in shape, so the protrusion portion 3107 is tightly embedded in the window 3093. In order to ensure the overall strength and the like, the battery compartment housing 310 may be made of a hard metal, a hard plastic, or the like, but at least, the protrusion portion 3107 is made of a hard material that does not substantially affect the signal receiving and sending of the antenna 3021.

[About the Alarm Module]

Referring to FIG. 5, in the present embodiment, the alarm module 306 comprises a sound alarm module 3061 (e.g., a buzzer and a driver thereof) capable of generating a sound alarm, and a light alarm module (e.g., an LED module and a driver thereof which are not shown in the Figure) capable of emitting a light alarm. A sound transmission hole 3104 is formed in the battery compartment housing 310 (it is formed in the lower portion of the lower battery compartment cover 3102 in the present embodiment) and corresponds to the mounting position of the sound alarm module 3061; and a waterproof sound transmission film is adhered to the sound transmission hole, so that not only is transmission of alarm sound free from influence, but also dust, water and the like are prevented from entering into the battery compartment through the sound transmission hole 3104.

In addition, the light alarm module is mounted on the GPS circuit board 3042, is communicably connected to the CPU module 301 through a pin 3044 arranged on the GPS circuit board 3042 described later, and is capable of emitting the light alarm under the control of the CPU module 301. Moreover, a light guide hole 3043 (referring to FIG. 4) is formed in a GPS protection cover 3043 described later, and a light guide post 3063 is exposed out of the GPS protection cover 3043 from the light guide hole 3105 (referring to FIG. 3 (A)), so that light emitted from the LED is guided out of the anti-theft lock.

By arranging the light alarm module on the GPS circuit board near the outer surface of the anti-theft lock, the length of a path travelled by light which is emitted by the LED and is guided from the inside of the anti-theft lock to the outside is shortened, ensuring the brightness of the light alarm and simplifying a circuit wiring design.

It should be noted that in the present embodiment, both the sound alarm module 3061 and the light alarm module are provided; or one of them may be provided as required. Alternatively, as the anti-theft system of the present invention has other anti-theft strategies as described above, the anti-theft lock 30 may not be provided with the alarm module 306.

[About the Signal Receiving/Sending Module]

Figure 8:
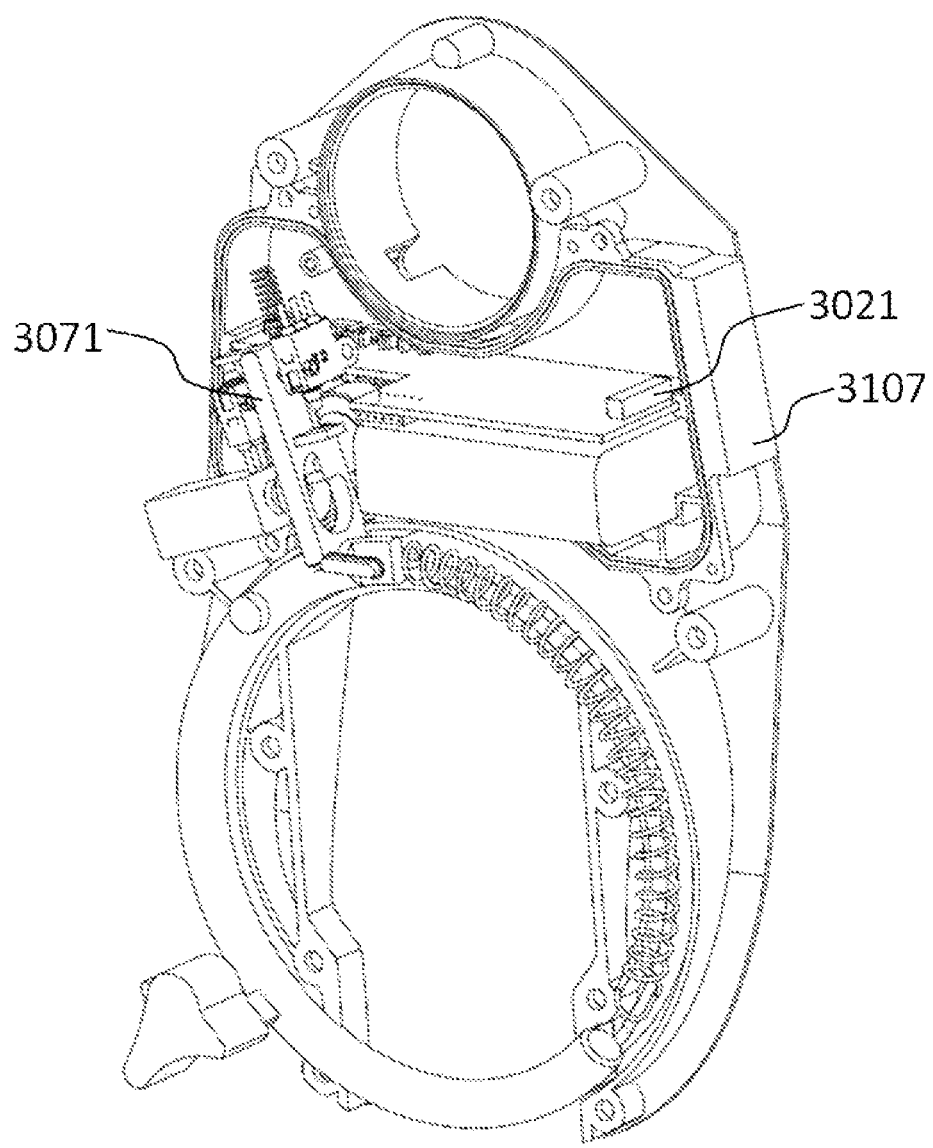
FIG. 8 is a front view the anti-theft lock after removing the face case, an upper battery compartment cover, the sealing gasket, the GPS circuit board and the GPS protection cover when viewed from the right side.

The signal receiving/sending module 302 is integrated on the PCB 311. Referring to FIGS. 5 and 8, an antenna 3021 is arranged on the PCB 311 and close to the window 303 of the case 309. Therefore, when signal receiving/sending is performed between the antenna and the mobile communication equipment 1 as well as the cloud calculator 2 through a wireless network, poor information receiving/sending caused by a fact that the signal is shielded or blocked by the case 309 or the battery compartment housing 310 is avoided.

[About the Positioning Module]

In the present embodiment, a GPS module is adopted as the positioning module 304. Referring to FIG. 5, as described above, the GPS protection cover 3043 is in a form of a trapezoid stage with oblique sides. After the GPS circuit board 3042 is accommodated inside the GPS protection cover, the GPS protection cover attached with a sealing gasket 3041 is buckled at a positioning module mounting portion at the front surface side of the face case 3091, and is fixed to the face case 3091 via clamping, bonding, bolting, riveting or the like. Preferably, the GPS protection cover is made of a hard material (which cannot be easily damaged) which does not substantially affect the receiving of a GPS signal. Therefore, the GPS circuit board 3042 is sealed in a closed space surrounded by the GPS protection cover 3043 and the sealing gasket 3041 in a waterproof and dustproof manner, so that it is ensured that the GPS signal can be received, and the GPS circuit board 3042 is protected from damage. In addition, a pin 3044 of the GPS circuit board 3042 passes through pin through vias 3106 (referring to FIG. 5 and FIG. 7 (A)) formed in corresponding positions of the sealing gasket 3041, the face case 3091 and the battery compartment housing 309 (particularly, the upper battery compartment cover 3101) to be inserted into a connector arranged on the PCB 311, so that the GPS module and the light alarm module which are located on the GPS circuit board can communicate with the CPU module 301 on the PCB 311.

[About the Lock Control Module]

FIG. 7 is a schematic view of an internal structure of the anti-theft lock 30 according to the embodiment of the present embodiment, wherein (A) is a front view of the anti-theft lock after removing the face case 3091, the sealing gasket 3041, the GPS circuit board 3042 and the GPS protection cover 3043, and (B) is a rear view of the anti-theft lock after removing the bottom case 3092. FIG. 8 is a front view the anti-theft lock after removing the face case 3091, the upper battery compartment cover 3101, the sealing gasket 3041, the GPS circuit board 3042 and the GPS protection cover 3043 when viewed from the right side.

A mechanical part of the anti-theft lock provided by the present invention comprises a lock pin provided with a retaining groove 3211 and configured to open or close a lock opening through movement thereof to enable the lock to be unlocked or locked, a tongue configured to stop or release movement of the lock pin by entering or exiting from the retaining groove 3211 of the lock pin, a first force application member for exerting, on the lock pin, a force allowing the same to move in the locking direction, and a second force application member for exerting, on the tongue, a force allowing the same to move in the direction of entering the retaining groove 3211 of the lock pin.

The lock control module comprises: a motor driver configured to receive an instruction signal from a CPU module to control the rotation of an output shaft of a motor assembly; the motor assembly configured to enable the output shaft to rotate according to a driving signal from a motor driver; the output shaft connected to the motor assembly; a tongue driving member configured to convert a rotational driving force of the motor assembly into a driving force allowing the tongue to move out of the retaining groove 3211 of the lock pin ; and a location sensor configured to detect the location of the tongue and output a signal indicating the location of the tongue to the CPU module.

Particularly, in this embodiment, the anti-theft lock 30 is horseshoe-shaped; and the locking pin 3073B is annular, and moves along an annular lock groove 312 formed in the case 309 to open or close the lock opening so as to enable the lock to be unlocked or locked.

The tongue 3071 is configured to stop or release the movement of the lock pin 3073B along the C-shaped lock groove 312 by entering or exiting from the retaining groove 3211 of the lock pin 3073B. Referring to FIG. 8, a driving hole 3213 allowing a projection 3215 of the tongue driving member 3074 to extend into is formed in the middle of the tongue 3071.

In this embodiment, the first force application member is a tension spring 3073A whose one end is fixed in the lock groove 312 and the other end thereof is connected to a non-lock opening end of the lock pin 3073B, and is configured to exert, on the lock pin 3073B, a force to pull the lock pin towards the unlocking direction. Of course, in a variation embodiment, for example, the first force application member adopts a spring whose one end is fixed in the lock groove 312 and the other end thereof exerts, on the lock pin 3073B, an elastic force to cause the same to move in the locking direction. That is, during locking, a lock opening end of the lock pin 3073B closes the lock opening and compresses the spring, and the spring generates a force to rebound the lock pin. Thus, when the tongue moves out of the retaining groove 3211, the force of the spring is released to eject the lock pin, so that the lock opening is opened. Besides, this function may be achieved via other manners.

In addition, referring to FIG. 5, in this embodiment, the motor assembly comprises a motor 3077 for supplying a power source to the tongue 3071 to allow the same to move, a sealing gasket 3076 mounted at the output shaft side of the motor 3077, and a motor box 3077 for accommodating the motor 3077 and the sealing gasket 3076 inside the motor box 3075. By providing the sealing gasket 3077 and the motor box 3075 with respect to the motor 3077, the dustproof and waterproof motor assembly can be formed to improve the environmental resistance of the anti-theft lock. The motor assembly is driven by a motor driver (not shown in the Figure) mounted on the PCB 311 to enable the output shaft to rotate.

In this embodiment, the tongue driving member may resemble a crank structure. Referring to FIG. 5, one end of the tongue driving member 3074 is connected to the output shaft of the motor assembly, and the other end thereof is provided with the projection 3215 inserted into the driving hole 3213 formed in the tongue. When the output shaft of the motor assembly rotates, the projection 3215 is driven to rotate along a circular trace using an eccentric distance as the radius. In addition, of course, the tongue driving member is not limited to resemble the crank structure of the present embodiment, but may resemble any structure as long as it can convert a rotational driving force of the motor assembly into a driving force allowing the tongue to move out of the retaining groove 3211 of the lock pin, or may adopt any transmission mode, such as a worm structure or the like.

The driving hole 3213 is formed in the tongue 3071 as described above, and a stopper 3217 with a stopper horizontal surface and a stopper vertical surface is formed in the driving hole 3213. The driving hole 3213 is formed to realize the following unlocking and locking processes.

Unlocking Process

When the tongue 3071 is in the retaining groove 3211 of the lock pin, the projection 3215 of tongue driving member is in a standby state at a position not interacting with the stopper 3217 in the driving hole 3213. When the lock is to be opened, the projection 3215 of the tongue driving member is rotated to a position interacting with the stopper 3217 in the driving hole 3213, and is contacted with the stopper 3217 on the stopper horizontal surface, and while the projection 3215 continues to rotate against and along the stopper horizontal, surface the stopper 3217 and hence the tongue 3071 is moved upwards by the projection 3215 as long as the projection 3215 and the stopper horizontal surface are contacted, so that the tongue 3071 is driven to move in the direction of moving out of the retaining groove 3211, and the spring 3078 which exerts, on the tongue 3071, the force to allow the same to enter the retaining groove 3211 of the lock pin 3073B is compressed. When the projection 3215 continues to rotate and then goes beyond the stopper horizontal surface to the stopper vertical surface, the tongue 3071 loses a force allowing it to move out of the retaining groove 3211, so the tongue moves in a direction of entering the retaining groove 3211 of the lock pin under the force of the spring 3078 till it is propped against the lock pin. Here, the lock pin is already in an unlocking state under the action of the tension spring 3073A, and the retaining groove 3211 is moved to a position not corresponding to the tongue, so the tongue is propped against the non-retaining groove part of the locking pin; and at the time, the projection 3215 of the tongue driving member is rotated to a first position in a standby state.

Locking Process

When the latch pin 3073 is pulled to the locking direction, the retaining groove 3211 is moved to the position corresponding to the tongue 3071 along with the movement of the lock pin 3073B, and the tongue 3071 enters the retaining groove 3211 under the thrust of the spring 3078 to stop the movement of the lock pin 3073B, so that the locking process is completed.

To achieve the above processes, the driving hole 3213 may take any of various shapes. For example, in the present embodiment, the driving hole 3213 is substantially b-shaped, and the top of the right semicircle of the b-shaped driving hole 3213 corresponds to the stopper 3217. For example, the middle position of a connection portion between the right semicircle of the b-shaped driving hole 3213 and a vertical line serves as the first position, and the projection 3215 is in a standby state at this position (hereinafter also referred to as the first position). In the unlocking process, when rotating anticlockwise to the top (the stopper 3217) along the right semicircle of the b-shaped driving hole 3213 from the bottom up, the projection 3215 drives the tongue to move upwards (in a direction of moving out of the retaining groove 3211) while being propped against the stopper 3217; when the projection 3215 reaches a threshold position (hereinafter also referred to as a second position) where it will go beyond the stopper 3217, the tongue reaches the maximum position in an upward moving direction (the direction of moving out of the retaining groove 3211), then the projection 3215 goes beyond the stopper 3217 to enter a vertical portion of the b-shaped driving hole 3213, and the tongue loses a force for propping it upwards, so that the tongue moves downwards (in a direction of entering the retaining groove 3211) under the thrust of the spring 3078 to be propped against the lock pin; and here, the projection 3215 stops rotating or moves to the first position to be in standby state.

Figure 9:
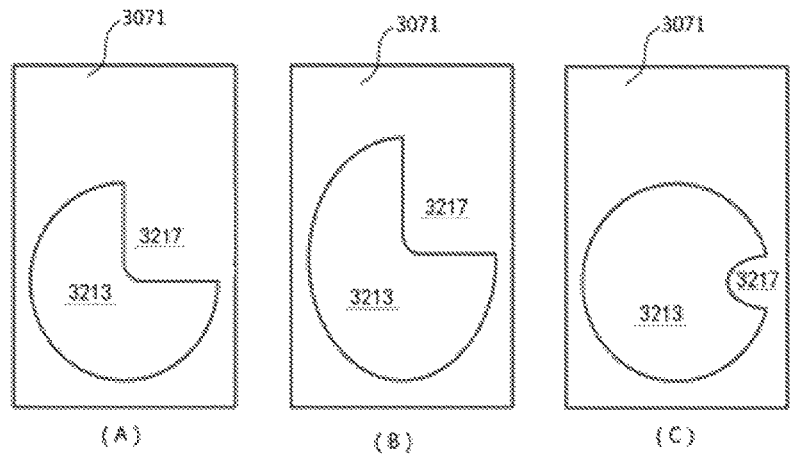
FIG. 9 shows schematic views of shapes of a driving hole, and each of (A)-(C) in FIG. 9 illustrates one shape of the driving hole.

FIG. 9 shows schematic views of exemplary shapes of a driving hole 3213. The b-shaped driving hole 3213 may be in a shape of an approximately three-quarter circle as shown in FIG. 9 (A), or an approximately three-quarter prolate ellipse as shown in FIG. 9 (B) as long as the diameter of the circle or minor axis of the prolate ellipse is not less than the diameter of the circular rotation trace of the projection 3215. In addition, instead of using the b-shaped driving hole 3213, a protrusion arranging in the approximate circle as shown in FIG. 9 (C) may serve as the stopper 3217. Therefore, the shapes of the driving hole 3213 are various, and the driving hole 3213 in any shape may be available as long as it can cooperate with the tongue driving member to realize the above unlocking and locking processes.

In addition, in the present embodiment, location sensors 3072 for detecting the location of the tongue 3071 comprise a first limit switch 3072A and a second limit switch 3072B located at the left and right sides of the tongue 3071, respectively. The two limit switches may be implemented through pressure sensors. Particularly, referring to FIG. 7

(A), a first limit piece 3071A and a second limit piece 3071B are arranged at both sides of the tongue 3071 along its moving direction, and located at staggered positions. The first limit switch 3072A and the second limit switch 3072B are arranged at positions corresponding to the first limit piece 3071A and the second limit piece 3071B, respectively. When the tongue 3071 enters the retaining groove 3211 in the lock pin 3073B, the first limit piece 3071A is propped against the first limit switch 3072A to trigger the first limit switch 3072A to generate a first limit signal to be reported to the CPU module 301. Thus, the CPU module 301 is informed that the anti-theft lock is in the locking state currently; and here, the second limit piece 3071B is separated from the second limit switch 3072B, so the second limit piece will not trigger the second limit switch to generate a limit signal.

When unlocking is required, the CPU module 301 instructs the motor driver to drive the motor assembly to rotate; the tongue 3071 is driven by the tongue driving member to move out of the retaining groove 3211; here, the two limit pieces move along with the movement of the tongue, and the first limit piece 3071A is separated from the first limit switch 3072A; and when the tongue 3071 continues to move to reach or approach the maximum movement distance point, the second limit piece 3071B is propped against the second limit switch 3072B to trigger the same to generate a second limit signal to be reported to the CPU module 301. Thus, the CPU module 301 is informed that the anti-theft lock is in the locking state currently, and instructs the motor driver to stop driving the motor. Here, the projection 3215, connected to the output shaft of the motor, of the tongue driving member stops moving in the inertia effect after reaching the second position. Alternatively, after receiving the second limit signal, the CPU module 301 may instruct the motor driver to drive the motor to rotate continuously for a preset time period, so that the projection 3215 can be rotated back to the first position.

In the above embodiment, the combination of the pressure sensors and the limit pieces on the tongue is taken as an example to illustrate the detection of the unlocking and locking states, but the present invention is not limited thereto. It is also possible to realize the detection of the unlocking and locking states by various manners, for example, by a combination of laser sensors and location markers on the tongue, or by arranging a distance measurement sensor in the moving direction of the tongue to measure a distance between the tongue and the distance measurement sensor to trigger a location detection signal.

The anti-theft lock provided by the present invention is illustrated by taking a horseshoe-shaped lock for a bicycle as an example, but obviously, the form of the anti-theft lock is not limited to the horseshoe-shaped lock, and may be any lock which is provided with a lock opening and a lock pin and capable of realizing locking and unlocking by moving the lock pin to close or open the lock opening. Of course, the anti-theft lock can not only be used for bicycles, but also any object which needs to be locked.

Although various concepts are described in detail, it is understood by those skilled in the art that various modifications and substitutions of those concepts may be achievable under the spirit of the overall teachings of the present invention. Those skilled in the art can implement the present invention as set forth in the claims without excessive tests via conventional techniques. It is also understood that the specific concepts disclosed are merely illustrative but are not intended to limit the scope of the present invention. The scope of the present invention is determined by the full scope of the appended claims and equivalent solutions thereof.

What is claimed is:

1. An anti-theft lock, comprising:
   a lock pin provided with a retaining groove and configured to realize unlocking or locking through movement of the lock pin;
   a tongue configured to be able to enter the retaining groove to stop the movement of the lock pin or move out of the retaining groove to release the lock pin to allow the lock pin to move, a driving hole being formed in the tongue and arranged with a stopper; and
   a tongue driving member configured to convert a rotational driving force of the motor into a driving force allowing the tongue to move out of the retaining groove, one end of the tongue driving member being connected to an output shaft of a motor in such a way that the tongue driving member is rotated with the motor, and another end of the tongue driving member being formed as a projection in such a way that when the tongue driving member is rotated, the projection is rotated along a circular trace taking an eccentric distance as a radius thereof,
   wherein:
   the projection extends into the driving hole and is configured to rotate against the stopper so as to drive the tongue to move in a direction of moving out of the retaining groove,
   when the projection continues to rotate and then goes beyond the stopper, the tongue loses a force allowing the tongue to move out of the retaining groove, and the driving hole is b-shaped through which an unlocking and a locking of the lock are realized.

2. The anti-theft lock of claim 1, further comprising a first force application member configured to exert, on the lock pin, a force allowing the lock pin to move in an unlocking direction.

3. The anti-theft lock of claim 1, further comprising a second force application member configured to exert, on the tongue, a force allowing the tongue to move in a direction of entering the retaining groove.

4. The anti-theft lock of claim 1, comprising: a motor assembly including a motor, a sealing gasket mounted at an output shaft side of the motor, and a motor box for accommodating the motor and the sealing gasket therein.

5. The anti-theft lock of claim 2, wherein the first force application member is a tension spring, one end of the tension spring is fixed in a lock groove, and the other end thereof is connected to a non-lock opening end of the lock pin.

6. The anti-theft lock of claim 1, comprising: a location sensor configured to detect the location of the tongue.

7. The anti-theft lock of claim 6, wherein the location sensor comprises a first limit switch and a second limit switch; a first limit piece and a second limit piece are, respectively, arranged at two sides of the tongue; the first limit switch corresponds to the first limit piece in position; the second limit switch corresponds to the second limit piece in position; when the tongue enters the retaining groove, the first limit piece triggers the first limit switch; and when the tongue moves out of the retaining groove and moves to the maximum movement distance point, the second limit piece triggers the second limit switch.

8. The anti-theft lock of claim 1, comprising a case, wherein the case comprises a lock body portion and side arm portions extending from left and right sides of the lock body portion, respectively, to form a C-shaped lock opening; the tongue and the tongue driving member are accommodated in the case; a C-shaped lock groove is formed inside the side arm portion; and the lock pin is annular, and is capable of moving in the lock groove.

* * * * *